United States Patent Office 3,533,988
Patented Oct. 13, 1970

3,533,988
RUBBER MASTERBATCH CONTAINING
HUMIC ACIDS
Donald Cyral Morris, Norwalk, Gustav Christian Maassen, Wilton, and Raymond Reed Waterman, Easton, Conn., assignors to R. T. Vanderbilt Company, Inc., New York, N.Y., a corporation of New York
No Drawing. Filed June 2, 1967, Ser. No. 643,073
Int. Cl. C08c 11/04; C08d 9/00
U.S. Cl. 260—41.5    10 Claims

ABSTRACT OF THE DISCLOSURE

This disclosure relates to preparing a masterbatch of rubber and humic acid. In the disclosure, the humic acid containing masterbatch is provided without precipitation, filtration and washing from a mixture of a rubber latex and a salt of humic acid with a water-soluble, volatile base.

---

It is known to form a masterbatch by uniformly and intimately dispersing in a first rubber considerable quantities of various fillers, e.g., carbon black, silica, silicates, lignin and the like. This has been accomplished by strong agitation of an aqueous dispersion of filler and rubber latex just prior to the coagulation of the latex or by coprecipitating filler and rubber from a latex containing a filler in soluble form. For example, a carbon black masterbatch must be prepared by the agitation method; a silica masterbatch may be prepared by either the agitation method or the co-precipitation method; and a lignin masterbatch is prepared usually by the co-precipitation method.

This masterbatch of filler and first rubber may be employed to introduce a desired quantity of filler into a second rubber. In other words, the amount of masterbatch calculated to contain the desired quantity of predispersed filler is mixed with the second rubber. Therefore, a minimum of milling is required to disperse the filler throughout the second rubber.

In the past, attempts have been made to prepare satisfactorily a masterbatch of rubber and humic acid or humates, such as a partial polyvalent metal salt of humic acid (U.S. Pat. No. 3,075,931; Tibenham and Grace, Industrial and Engineering Chemistry, April 1954, vol. 46, No. 4, pp. 824–8). One prior art method was to add a soluble humate, e.g., sodium humate, to a rubber latex. A polyvalent metal salt, e.g., calcium chloride, and an acid, e.g., hydrochloric acid, were then added to form a co-precipitate of rubber and partial polyvalent metal humate, e.g., partial calcium humate. However, the masterbatch formed by this or other prior art methods was a gel which was extremely difficult to filter. It was even more difficult to wash from the masterbatch residual salts, such as sodium chloride, which were formed during the co-precipitation and which would adversely affect the tensile and electrical properties of a vulcanizate therefrom. Prior to this invention, therefore, humate and humic acid masterbatches were difficult, costly and time-consuming to prepare.

It has now been discovered that a humic acid-rubber masterbatch can be prepared easily without any filtering and washing steps. Thus, in accordance with one embodiment of the present invention, a salt of humic acid with a volatile base, e.g., ammonium humate, is added as a solution to a rubber latex to form an aqueous mixture. This aqueous mixture is subsequently dried to eliminate water and volatile base by volatilization. The dried product therefrom is a masterbatch which has humic acid uniformly and very finely dispersed through a rubber crumb and which is free from any deleterious salts.

The rubbers applicable for forming the masterbatch of the invention are natural rubber and any synthetic rubber prepared from an elastomeric latex that is stable in the presence of alkali. These include, among others, the rubbers disclosed in U.S. Pat. No. 3,075,931, e.g., natural rubber; homopolymers of butadiene, isobutylene, isoprene and chloroprene (neoprene); copolymers of butadiene or isoprene with other ethylenically unsaturated monomers copolymerizable therewith, such as styrene, acrylonitrile and isobutylene. Among others, the copolymers include the copolymer of butadiene with styrene known as SBR, the copolymer of butadiene with acrylonitrile known as NBR and the copolymer of isobutylene with isoprene known as butyl rubber. The preferred rubber is SBR. The SBR latex may be prepared by the well known aqueous emulsion copolymerization of 1,3-butadiene with styrene, wherein the monomers are emulsified in water with surface active agents and are polymerized subsequently in the presence of suitable catalysts and regulators to form a latex.

The volatile bases suitable for preparing the humates used for forming the masterbatch of the invention include ammonia and water soluble, volatile amines including methyl amine, dimethyl amine, trimethyl amine, ethyl amine, diethyl amine and triethyl amine. The preferred volatile base is ammonia. The salts of humic acid with volatile bases may be prepared by any suitable method. One method is to dissolve humic acid in an aqueous solution of the volatile base. For instance, humic acid may be dissolved in a slight stoichiometric excess of ammonium hydroxide or aqueous dimethylamine. Humic acid is well known in the art as described in U.S. Pat. No. 3,075,931 and the aforementioned Tibenham et al. article which are incorporated herein by reference. Humic acid, for example, may be derived by the oxidation of coal under controlled oxidation to give organic molecules with a molecular weight of about 700–1400.

The amount of ammonium humate and rubber latex in the mixture prior to drying may vary over a wide range. Generally, the mixture contains about 2% to 18% ammonium humate solids and about 2% to 65% rubber latex solids. The balance is water. The more concentrated the mixture, the less energy is required to produce a usable masterbatch. Other optional ingredients may be included therein, such as antioxidants, metal oxides and extender oils.

After the ammonium humate-rubber latex mixture is formed, it is dried directly, that is, without any percipitation step, filtering step or washing step. Any drying means may be employed provided that the ammonia is elimated from the ammonium humate by volatilization following elimination of the water from the mixture by volatilization. Therefore, drum drying, spray drying and oven drying may be applicable; however, drum drying is preferred. The drying conditions, e.g., temperature and time, are selected to break down the ammonium humate into volatile ammonia and humic acid and to drive off the water leaving humic acid dispersed uniformly and intimately in the resulting rubber crumb. For example, drum drying may be conducted at about 230° to 370° F. for about 3 to 600 seconds with the time varying inversely with the temperature.

The aforementioned dried product is a humic acid-rubber masterbatch. In general, the ratio of humic acid to rubber is in the range of about 25:100 to 300:100. This masterbatch alone or mixed with other rubbers may be vulcanized in the presence of a suitable curing system. Therefore, sufficient masterbatch may be blended with a second rubber to provide the amount of humic acid desired in the blend. The blend of masterbatch and second vulcanizable rubber may be compounded with other known ingredients, such as the following: vulcanizing agents, accelerators, activators, retarders, antioxidants, antiozonants, extenders, softeners, colorants and other fillers. The rubber is compounded by subjecting it to intimate mixing in an internal mixer (Banbury) or on an open rubber mill at a temperature in the range of about 75° F. to 400° F.

The compounded rubber containing humic acid masterbatch may be cured by any known method, such as steam, air and press or mold curing. For example, the compounded rubber may be vulcanized in a mold at a temperature between about 280° F. and 330° F. for about 20 minutes to 2 hours. In general, a shorter time is required at the higher temperatures.

Thus, in accordance with this invention, a uniform humic acid-rubber masterbatch can be prepared without any co-precipitation. The present invention avoids the use of an acid coagulant and the costly and time-consuming procedures of filtering and washing a slimy, gelatinous precipitate are eliminated. Furthermore, much higher reinforcement is found in a vulcanizate containing the masterbatch of this invention than would be obtained by humic acid introduced without masterbatching.

The following examples are submitted to illustrate but not to limit this invention. Unless otherwise indicated, all parts and percentages in the specification are based upon weight.

EXAMPLE I

Ammonium humate (in an aqueous solution) was added to a latex of a rubbery copolymer (SBR) of 23.5% styrene with 76.5% butadiene copolymerized below 50° F. in the presence of fatty acid-rosin acid emulsifier and free from antioxidant and extender oil. The proportions were as follows:

| Components | Parts by weight | |
|---|---|---|
| | Dry | Wet |
| Butadiene-styrene copolymer (23.7% solids) | 100 | 422 |
| Ammonium humate (6.7% solution) | 100 | 1500 |

These components were mixed with a marine propeller type mixer. The mixture therefrom was poured onto a drum drier with rolls heated to 290–310° F. by 110 p.s.i. steam and revolving at 13.0–13.3 r.p.m. at a rate sufficient to dry the mixture and drive off the ammonia. The dried product was scraped off the drum with a knife. The resulting humic acid-rubber masterbatch was very small in particle size and had excellent handling properties.

EXAMPLE II

A mixture of ammonium humate and rubber latex was prepared as described in Example I. This mixture was spray dried by using a gas inlet temperature of 650° F., a throughput of about 0.5 lb. per minute, and an outlet temperature reaching 343° F. without decomposition of the rubber. The spray dried masterbatch therefrom contained 4.61% moisture.

EXAMPLE III

An oven-dried masterbatch was prepared by drying the mixture of butadiene-styrene copolymer latex and humic acid of Example I at room temperature to remove water and subsequently heating for 8 hours in a 250° F. circulating air oven to drive off ammonia.

EXAMPLE IV

A masterbatch of humic acid and rubber was prepared by a co-precipitation method. The following components were employed:

| Components | Parts by weight | |
|---|---|---|
| | Dry | Wet |
| Humic acid | 100 | 100 |
| Sodium hydrixide (1.9% solution) | 17.1 | 900 |
| SBR of Example I (30% solids) | 100 | 333 |
| Age Rite Stalite, 65% emulsion [1] | 1.5 | 2.3 |
| Hydrochloric acid (37.5%) | 16.9 | 45 |
| Water | | 880 |

[1] Mono-octylated diphenylamine antioxidant.

The humic acid was added to sodium hydroxide solution and stirred until smooth. The rubber latex, premixed with antioxidant, was then added with stirring to the sodium humate solution. The latex-sodium humate mixture was acidified to pH 2.0 with hydrochloric acid to co-precipitate a homogeneous mixture of rubber and humic acid. The resulting slimy, gel-like product with residual chloride was diluted with water and filtered through a Buchner funnel. The filtered product was washed by redispersing in 6000 grams water and filtering again. After a second washing and filtering, the humic acid-rubber masterbatch was dried in a vacuum oven at 60° C. For a batch ten times this size, yielding 1800 grams of product, three weeks' time was required for the difficult filtering and washing steps.

Examples I, II and III demonstrate the ease and simplicity of the process of the invention for preparing a masterbatch of humic acid and rubber without any filtering and washing steps in comparison with Example IV which is typical of prior art processes.

EXAMPLE V

The masterbatch (100 parts) of Example I containing humic acid and a first rubber was mixed with 50 parts of a vulcanizable second rubber of 23.5% butadiene with 76.5% styrene (ASTM designation of SBR 1502) to form Compound A. Therefore, Compound A had 100 parts of total elastomer (first rubber and second rubber) and 50 parts of humic acid.

For comparative purposes, three other compounds were provided. Compound B was prepared by mixing with 100 parts of SBR 1502 rubber and 50 parts of dry humic acid which had been ball-milled for 8 hours. Compounds C and D were prepared to determine whether any differences in the physical properties of similar compounds could be attributed to differences in the rubber. Compound C contained only SBR 1502 (second rubber) and Compound D, 50% SBR 1502 blended with 50% by weight of the masterbatching rubber (first rubber); both contained 50 parts of medium thermal (MT) carbon black per 100 parts of rubber.

Compounds A, B, C and D containing the following components were mixed intimately in a Banbury mixer:

| Components: | Parts by wt. |
|---|---|
| Total elastomer [1] | 100 |
| Filler [2] | 50 |
| Stearic acid | 2 |
| Zinc oxide | 5 |
| Age Rite Stalite S [3] | 1 |
| K-Stay brand processing oil [4] | 2 |

[1] First rubber and/or second rubber.
[2] Humic acid or MT black.
[3] Dioctylated diphenylamine antioxidant.
[4] Oil soluble sulfonic acid of high molecular weight in petroleum base oil.

The following curing system was then added to each of the compounds on an open rubber mill:

| Components: | Parts by wt. |
|---|---|
| Diethylene glycol | See Table I |
| Sulfur | 2 |
| Benzothiazyl disulfide | 2 |
| Copper dimethyldithiocarbamate | 0.3 |

Each compound was press cured subsequently at 307° F. for 60 minutes. The physical properties of the resulting vulcanizates were determined by ASTM method D-412. The results are summarized in Table I:

TABLE 1

| Compounds | A | B | C | D |
|---|---|---|---|---|
| SBR 1502 rubber [1] | 50 | 100 | 100 | 50 |
| SBR rubber [2] | | | | 50 |
| Humic acid [3] | | 50 | | |
| Humic acid-SBR rubber masterbatch of Example I [4] | 100 | | | |
| MT carbon black | | | 50 | 50 |
| Diethylene glycol | 3 | 3 | | |
| Physical properties after 60 minutes cure at 307° F.: | | | | |
| Modulus at 300% elongation, p.s.i | 880 | 220 | 960 | |
| Tensile strength at break, p.s.i | 1860 | 300 | 960 | 920 |
| Elongation at break, percent | 640 | 500 | 300 | 260 |

[1] Second rubber.
[2] First rubber used in masterbatch of Example I.
[3] Added by conventional Banbury mixing.
[4] 50 parts first rubber and 50 parts humic acid.

This example shows that humic acid added dry to rubber in the Banbury (Compound B) gave a vulcanizate having very low modulus and tensile strength. Conversely, a humic acid masterbatch added to rubber to introduce an equal loading of humic acid (Compound A) gave a high modulus and tensile strength. This superiority was unexpected. It was not due to any difference inn the elastomers in Compounds A and B since the tensile strength in Compounds C and D were substantially the same.

EXAMPLE VI

Two humic acid-containing samples were provided by the method of Example I (Compound E) or by the method of Example IV (Compound F). The physical properties of the resulting vulcanizates were determined in accordance with Example V. The compounds and results are indicated in Table 2 as follows:

TABLE 2

| Compounds | E | F |
|---|---|---|
| SBR 1502 rubber | 50 | 50 |
| Masterbatch [1] | 100 | |
| Masterbatch [2] | | 100 |
| Diethylene glycol | 3 | 3 |
| Physical properties after 60 minute cure at 307° F.: | | |
| Modulus, p.s.i | 940 | 720 |
| Tensile strength, p.s.i | 1960 | 1760 |

[1] Drum-dried masterbatch prepared from ammonium humate of Example I.
[2] Co-precipitated masterbatch prepared from sodium humate of Example IV.

It is evident from this example that the humic acid masterbatch of the invention (Compound E) prepared from ammonium humate by drum drying is more effective in the reinforcement of rubber than the humic acid masterbatch (Compound F) prepared from sodium humate by co-precipitation followed by filtration, washing and drying. Furthermore, the humic acid from ammonium humate cures faster. Another advantage of the ammonium humate method is the ease of preparation.

EXAMPLE VII

Compound G was formed by adding the masterbatch of Example I to SBR 1502 rubber. Compound H, a control with equal loading, was formed by mixing MT carbon black into SBR 1502 rubber in a Banbury. The curing system composed of sulfur, 2 parts by weight, benzothiazyl disulfide, 2 parts by weight, and copper dimethyldithiocarbamate, 0.3 part by weight, was added to each of these compositions on the mill.

Vulcanizates prepared from each of these two compounds were tested according to the methods described in Example V. The results of the test are indicated in Table 3.

TABLE 3

| Compounds | G | H |
|---|---|---|
| SBR 1502 | 50 | 100 |
| Humic acid-SBR masterbatch of Example I [1] | 100 | |
| MT carbon black | | 50 |
| Physical properties after 60 minute cure at 307° F.: | | |
| Modulus, p.s.i | 900 | |
| Tensile strength, p.s.i | 1760 | 880 |

[1] 50 parts SBR and 50 parts humic acid.

This example shows that the humic acid masterbatch of the invention produces much higher reinforcement than an equal loading of MT black in a vulcanizate therefrom.

EXAMPLE VIII

Separate portions of humic acid-rubber masterbatch were prepared according to Example I and drum dried according to Example I, spray dried according to Example II and oven dried according to Example III. They were blended with SBR 1502 and compounded as described in Example V in the absence of diethylene glycol. A control compound contained an MT black introduced dry in the Banbury in an amount equivalent in weight to that of humic acid loading in the blends above. The curing system of Example VII was added on the mill to each of the compositions thus formed.

The physical properties of each vulcanizate were tested as described in Example V. Furthermore, the hardness of each vulcanizate was determined by ASTM method D-2240. The results are listed in Table 4.

TABLE 4

| Compounds | I | J | K | L |
|---|---|---|---|---|
| SBR 1502 | 50 | 50 | 50 | 100 |
| Spray dried humic acid-SBR masterbatch [1] | 100 | | | |
| Drum dried humic acid-SBR masterbatch [1] | | 100 | | |
| Oven dried humic acid-SBR masterbatch [1] | | | 100 | |
| MT carbon black | | | | 50 |
| Physical properties after 50 minutes cure at 307° F.: | | | | |
| Tensile strength, p.s.i | 1280 | 1520 | 1420 | 920 |
| Elongation, percent | 520 | 560 | 440 | 300 |
| Hardness, Shore D | 66 | 65 | 66 | 60 |

[1] 50 parts humic acid and 50 parts SBR.

It is evident that all methods of drying the humic acid masterbatch employed in this example provide vulcanizates having higher tensile strength and hardness values than that containing MT carbon black. Therefore, humic acid masterbatches of the invention have been shown to confer unique properties to rubber compounds which are different from those produced by MT carbon black filler.

EXAMPLE IX

The components indicated below were used to prepare a humic acid-rubber master-batch by a co-precipitation method.

| Components | Parts by weight | |
|---|---|---|
| | Dry | Wet |
| Humic acid | 100 | 100 |
| Ammonium hydroxide (2.8% solution) | 35.4 | 1300 |
| SBR of Example I (23.7% solids) | 100 | 422 |
| Age Rite Stalite, 65% emulsion | 1.5 | 2.3 |
| Hydrochloric acid (18%) | 18 | 100 |
| Water | | 880 |

The humic acid was added with stirring to the ammonium hydroxide. To the resulting ammonium humate solution was added with stirring the rubber latex which was premixed with Age Rite Stalite antioxidant. The latex-humic acid mixture was acidified to pH 2.0 with hydrochloric acid to co-precipitate a homogeneous mixture of humic acid and rubber. The slimy, gelatinous precipitate containing residual ammonium chloride was washed and filtered as described in Example IV to provide a masterbatch of humic acid and rubber. For a batch 10 times this size, the difficult filtering and washing steps required a period of three weeks.

Comparison of Examples I and IX demonstrates that amomnium humate-rubber masterbatch prepared according to the process of this invention without any coagulation, filtering and washing steps saves much time and effort.

EXAMPLE X

Ethylammonium humate was prepared by stirring 220 grams of a 70% aqueous solution of ethylamine into 4540 grams of a 15.6% slurry of humic acid (710 grams, dry basis) to bring to a pH of 10. The humic acid went into solution as ethylammonium humate upon standing at room temperature overnight.

Dimethylammonium humate was prepared similarly by stirring 420 grams of a 40% aqueous solution of dimethylamine into a second portion of the 15.6% slurry of humic acid above to bring to a pH of 10.6. The humic acid went into solution as dimethylammonium humate upon standing overnight at room temperature.

Humic acid-rubber masterbatch M was formed by mixing the aqueous solution of ethylammonium humate with the SBR latex of Example I in the presence of an antioxidant. The proportions were was follows:

| Components | Parts by weight Dry | Wet |
|---|---|---|
| Butadiene-styrene copolymer (21.6% solids) | 710 | 3240 |
| Ethylammonium humate (as a solution) | 710 | 4760 |
| Age Rite Stalite S (50% dispersion) | 14.2 | 28.4 |

This mixture was dried on glass trays at 73° F. and 50% relative humidity, removed from the trays in the form of crumbs, heated subsequently to constant weight in a 220° F. oven for 8 hours to drive off the amine and to form water-insoluble crumbs of humic acid masterbatch.

The same procedure was employed to form humic acid-rubber masterbatch N from dimethylammonium humate except that the dimethylammonium humate solution was substituted for the ethylammonium humate solution.

Each masterbatch (100 parts) containing humic acid and a first rubber was mixed independently with 50 parts of a vulcanizable second hubber (SBR 1502 of Example V) to form Compound M and Compound N. Compound O was prepared in the Banubury for comparative purposes from 100 parts of SBR rubber (second rubber) and 50 parts of MT carbon black.

Compounds M, N and O, which were mixed independently in a Banubury mixer, each had the following components:

| Components: | Parts by weight |
|---|---|
| Total elastomer [1] | 100 |
| Filler [2] | 50 |
| Stearic acid | 2 |
| Zinc oxide | 5 |
| Age Rite Stalite S | 1 |
| K-Stay brand processing oil | 2 |

[1] First rubber and/or second rubber.
[2] Humic acid or MT black.

The curing system described in Example VII was added on the mill to each of the compositions thus formed.

Physical properties of vulcanizates prepared from each of the compounds were determined as described in Example V. The results are indicated in Table 5.

TABLE 5

| Compounds | M | N | O |
|---|---|---|---|
| SBR 1502 rubber [1] | 50 | 50 | 100 |
| SBR rubber [2] | 50 | 50 | |
| Humic acid [3] | 50 | | |
| Humic acid [4] | | 50 | |
| MT carbon black | | | 50 |
| Physical properties after 60 minutes cure at 307° F.: | | | |
| Modulus at 300% elongation, p.s.i | 980 | 980 | 900 |
| Tensile strength at break, p.s.i | 1100 | 980 | 960 |
| Elongation at break, percent | 310 | 300 | 310 |

[1] Second rubber.
[2] First rubber.
[3] From ethylammonium humate.
[4] From dimethylammoni m humate.

By comparing Compound M and Compound N in Table 5 with Compound B in Table 1, it is evident that a humic acid masterbatch prepared in accordance with this invention from an alkyl-substituted amine provides a vastly superior vulcanizate than one provided by milling humic acid, per se, into SBR rubber. It is also evident from this example that the vulcanizates of the invention have higher modulus and tensile strength at comparable elongation as compared with a vulcanizate having an equal loading of MT carbon black.

Having set forth the general nature and specific embodiments of the present invention, the true scope is now particularly pointed out in the appended claims.

What is claimed is:

1. A process for preparing a masterbatch free from deleterious salts which comprises forming an aqueous mixture of a salt of coal-derived humic acid with a water-soluble, volatile base and a rubber latex; and drying said mixture to eliminate the volatile base and water by volatilization and to provide without precipitation, filtration and washing steps a masterbatch of humic acid dispersed throughout a rubber crumb.

2. The process according to claim 1 in which the rubber is natural rubber; homopolmers of butadiene, isobutylene, isoprene or chloroprene; or copolymers of butadiene or isoprene with styrene, acrylonitrile or isobutylene.

3. The process according to claim 1 in which the mixture is ammonium humate and rubber latex dried by drum drying.

4. The process according to claim 1 in which the mixture is ammonium humate and rubber latex dried by spray drying.

5. The process according to claim 1 in which the mixture is ammonium humate and rubber latex dried by oven drying.

6. A masterbatch prepared by the process of claim 1.

7. A vulcanizable blend which comprises (1) a masterbatch prepared by the process of claim 1, (2) a second rubber and (3) a curing system.

8. A vulcanizate having improved reinforcement which comprises a blend of (1) a masterbatch prepared by the process of claim 1 and (2) a vulcanizable second rubber; said blend having been vulcanized in the presence of a curing system.

9. The masterbatch according to claim 6 in which the rubber in natural rubber; homopolymers of butadiene, isobutylene, isoprene or chloroprene; or copolymers of butadiene or isoprene with styrene, acrylonitrile or isobutylene.

10. The masterbatch according to claim 6 in which the volatile base is ammonia or a volatile amine.

References Cited

UNITED STATES PATENTS 3,075,931   1/1963   Davidson et al.   260—17.4
3,356,623   12/1967   Schwartz   260—17.4

OTHER REFERENCES

Tibenham et al., Ind. and Eng. Chem. 46 (4), 824, 826 and 827 (1954).

WILLIAM H. SHORT, Primary Examiner

E. NIELSEN, Assistant Examiner

PO-1050
(5/69)

UNITED STATES PATENT OFFICE
CERTIFICATE OF CORRECTION

Patent No. 3,533,988  Dated October 13, 1970

Inventor(s) Donald Morris, Gustav Maassen, Raymond Waterman

It is certified that error appears in the above-identified patent and that said Letters Patent are hereby corrected as shown below:

Column 5, line 36, "inn" should be --in--;

Column 6, line 72, "35.4" should be --36.4--;

Column 7, line 60, "Banubury" should be --Banbury--;

Column 7, line 64, "Banubury" should be --Banbury--;

Column 8, line 21, "dimethylammoni m" should be --dimethylammonium--;

In Claim 9, line 72, "in" should be --is--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents